Patented July 27, 1937

2,088,027

UNITED STATES PATENT OFFICE 2,088,027

ALCOHOL SULPHATION PROCESS

George H. Law and Raymond W. McNamee, Charleston, W. Va., assignors, by mesne assignments, to Union Carbide and Carbon Corporation, a corporation of New York No Drawing. Application May 9, 1934, Serial No. 724,764

27 Claims. (Cl. 260—99.12)

This invention relates to the sulphation of alcohols containing eight or more carbon atoms in their molecule, and more especially it concerns a method for the production of the sulphate esters of such alcohols by the treatment of a solution thereof with a solution of a sulphating agent in a high-boiling solvent for the latter, and which preferably also is a solvent for the said alcohol and for the acid sulphate ester formed in the sulphation step.

The sulphuric acid esters produced in accordance with the invention are suitable for use as dispersing agents, as detergents for washing, scouring and bleaching operations, and as penetrants where it is desired to cause a treating liquid to penetrate a material highly resistant thereto, such as textiles, leather, felt, and the like. The acid sulphate esters and the neutral sulphate esters function actively as frothing and foaming agents in acid, neutral and alkaline solutions. Their calcium and magnesium salts are almost as soluble in water as the sodium salts.

Processes already are known for the sulphation of the primary alcohols corresponding to the higher fatty acids, such as lauryl alcohol and myristyl alcohol. Even when the sulphation was effected under very mild conditions, substantial amount of the true sulphonic acids of the alcohols were formed by uncontrolled local violent reaction between the alcohols and sulphating agent, the final products having a limited degree of purity.

Attempts have been made in the past to regulate the intensity of the sulphation reaction and improve the purity of the sulphate esters by reacting fatty alcohols and the sulphating agent in the presence of an inert, low-boiling solvent for the alcohol, such as carbon tetrachloride, trichlorethylene, and ethyl ether, particularly in sulphations carried out at low temperatures around −10° to 0° C. The results have not been entirely satisfactory due in part to the fact that heretofore the sulphating agent, such as sulphuric acid or chlorsulphonic acid, has been added in concentrated form to the solution of primary alcohols, with the result that local overheating and side reactions while somewhat limited were not eliminated.

Secondary and tertiary alcohols are much less stable than the primary alcohols; and the two former tend actively to form olefines when treated with sulphating agents in the usual manner. Therefore, it is highly desirable and often necessary to carry on the sulphation of these secondary and tertiary alcohols at temperatures lower than those used in sulphating the primary alcohols.

Among the more important objects of this present invention are: to provide in novel manner for sulphating alcohols containing eight or more carbon atoms in their molecular structures; to provide for reacting such an alcohol with a sulphating agent in the presence of a high-boiling inert solvent for the alcohol; to provide for sulphating an alcohol in the presence of an inert diluent which is a solvent both for the alcohol and for the sulphating agent; to provide in novel manner for sulphating an alcohol in the presence of a common solvent for the alcohol and sulphating agent and which acts to purify the sulphate produced; to provide in novel manner for the utilization of by-product hydrogen chloride from the sulphation for generating chlorsulphonic acid; and to provide in novel manner for the sulphation of relatively thin bodies of solutions of alcohols in a high-boiling solvent. These and other objects will become apparent as this description proceeds.

In its broadest scope, the process of this invention involves reacting an alcohol containing eight or more carbon atoms in its molecular structure, with a suitable sulphating agent, preferably a non-aqueous one which yields no water in the sulphation reaction, such as chlorsulphonic acid or dry sulphur trioxide. The sulphation is carried out in the presence of a high-boiling halogen-substituted ether such as bis-beta-chloroethyl ether, more commonly known as dichlorethyl ether, or other high-boiling solvent for both the alcohol and the chlorsulphonic acid or other sulphating agent. Among such high-boiling solvents may be mentioned also dichloroisopropyl ether and beta-chlorethyl ethoxy chlorethyl ether. When a liquid sulphating agent is used, both the alcohol and the sulphating agent are employed in the form of solutions thereof in the high-boiling solvent; and preferably sulphation temperatures of from about 0° C. to 60° C. are used.

The reaction mixture from the sulphation step, containing the acid sulphate ester, is then neutralized by a suitable base, such as the alkaline compounds of the alkali metals and alkaline earth metals, or the nitrogen bases. A dilute aqueous solution of the neutralizing agent advantageously may be used, the strength of the solution depending upon the solubility of the neutral sulphates. The neutralized mixture upon standing separates into layers. The aqueous layer that contains the neutral sulphate ester is evaporated under vacuum. The residue containing the ester may be purified by treatment with methanol or other organic solvent for the said ester. The resultant mixture is then filtered to remove inorganic salts, and the filtrate is taken to dryness under vacuum, yielding the purified ester.

In general, in the sulphation step higher temperatures and more concentrated solutions of alcohol and of sulphating agent in the high-boiling solvent may be employed with primary alcohols and with alcohols of low molecular weight than with secondary or tertiary alcohols or alcohols of higher molecular weight. Alcohol solutions containing from 50% to 99% of the alcohol; and chlorsulphonic acid solutions containing from 10% to 50% of the acid are especially suitable. In general, it is desirable to conduct the sulphation at about 20° C., using a 50% solution of the alcohol, and a 25% solution of chlorsulphonic acid. By conducting the sulphation at the higher temperatures of the range made possible by use of our invention, the hydrogen chloride evolved may be removed readily, and the reaction time is greatly shortened. The cost of refrigeration thus is substantially lowered, while undue losses of the reactants by uncontrolled side reactions are prevented.

During the sulphation reaction a dry inert gas, such as air, nitrogen, hydrogen, methane, or carbon dioxide, preferably is blown through the liquid mixture to agitate the latter thoroughly and assist in maintaining a uniform temperature throughout the same.

In instances where gaseous sulphur trioxide is employed as the sulphating agent, it preferably is mixed in small amounts with the inert gas to form a more or less dilute mixture of the reactant in the latter, and in this form it is contacted with the solution of the alcohol by being bubbled therethrough, or by being brought into intimate contact with a thin body or film thereof, as hereinafter described.

Instead of employing a synthetic gaseous mixture of sulphur trioxide in an inert gas, it is possible to utilize industrial gases, such as converter gases from a contact-process sulphuric acid plant. In this case, the gases are first cooled to the temperatures selected for the sulphation operation to prevent condensation of solid sulphur trioxide upon the walls of the reaction vessel during sulphation.

Since sulphur trioxide reacts slowly with bis-beta dichlorethyl ether at room temperatures, it is preferred when employing sulphur trioxide to effect the sulphation at low temperatures ranging from 0° to −20° C., using relatively dilute solutions of the alcohol in dichlorethyl ether containing from 5% to 20% by weight of the alcohol. Particularly satisfactory results have been obtained in operations conducted at about −10° C., using a 10% solution of the alcohol in the said ether or other high-boiling solvent.

An important feature of this modification of the invention using gaseous sulphur trioxide resides in flowing a thin body or film of a solution of the alcohol in dichlorethyl ether or its equivalent over a cold heat-transfer surface or diaphragm maintained by suitable refrigerating means at the desired reaction temperature. A stream of sulphur trioxide containing inert gases desirably flows countercurrent to the body of alcohol solution and in intimate contact therewith. A very large surface area of the alcohol is exposed to the sulphur trioxide, so that an unusually short reaction time is required. Moreover the effectiveness of the heat-transfer surface is high, due to the relatively limited volume of reactants to be cooled per unit of area of the said surface. The solution of alcohol and sulphation products may be recycled for increasing the yield of acid sulphates.

When chlorsulphonic acid or other chlorine-containing fluid is employed as the sulphating agent, the effluent gases from the sulphation reaction contain hydrogen chloride. These gases may be passed through a body of fuming sulphuric acid which absorbs the hydrogen chloride and generates chlorsulphonic acid. The latter may then be used in the process.

The invention may be illustrated by the following examples. All quantities indicated are given in parts by weight unless otherwise indicated.

*Example 1*

A solution of 214 parts of 7-ethyl-2-methylundecanol-4 in 210 parts of bis-beta chloroethyl ether was cooled to 16° C. A solution of 116.5 parts of chlorsulphonic acid in 300 parts of bis-beta chloroethyl ether was gradually added to the first-named solution during 15 minutes, while strongly agitating the same and bubbling air therethrough. The temperature of the mixture rose to 23.5° C. and was maintained during the reaction. The flow of inert gas (air) was continued for 15 minutes after addition of the acid was completed. The effluent gas from the reaction vessel was conducted through a body of 150 parts of 43% fuming sulphuric acid. The latter absorbed the hydrogen chloride content of the gases, thus generating chlorsulphonic acid, adapted for use in the process. The residual gases were stripped of any entrained sulphur trioxide by scrubbing them with water.

The liquid reaction mixture containing the acid sulphate ester was neutralized with a 2N solution of caustic soda. Upon standing, the neutralized mixture separated into two layers. The aqueous layer was evaporated to dryness on a steam bath under subatmospheric pressures ranging from 100 to 10 mm. of mercury, absolute. The residue was taken up in methanol, and the resulting mixture filtered free of insoluble inorganic substances. The filtrate was then evaporated under subatmospheric pressures of from 200 to 10 mm. of mercury, absolute, for removal of the solvent, yielding the neutral sulphate ester of the secondary tetradecyl alcohol as a white solid, soluble in water, methanol, acetone, and ether. It had a drop number of 80 at 30° C., this constant being determined in the manner hereinafter indicated.

*Example 2*

A solution of 11.65 parts of chlorsulphonic acid in 30 parts of bis-beta chloroethyl ether was gradually added to a well agitated solution of 19.2 parts of beta-phenylethyl isobutyl carbinol in 40 parts of bis-beta chloroethyl ether. A stream of inert gas (air) was blown through the solution to facilitate removal of hydrogen chloride formed. A temperature of about 20° C. was maintained throughout the addition of the acid. Upon completion of the sulphation, the reaction mixture was neutralized with a 1N caustic soda solution, and the aqueous layer that formed was treated in the manner indicated in Example 1. The final residue or neutral sulphate ester of the said isobutyl carbinol was a colorless, waxy solid which readily produced suds when shaken with water. It was soluble in the common organic solvents such as alcohol, acetone, ether, and also in water. It had a drop number at 30° C. of 36.

Example 3

A solution of 11.65 parts of chlorsulphonic acid in 30 parts of bis-beta chloroethyl ether was reacted with a solution of 19.2 parts of beta-hexahydrophenylethyl isobutyl carbinol in 40 parts of the said ether. The conditions of the sulphation and of the subsequent steps were substantially the same as those set out in Example 2. The final product was a colorless, waxy solid, soluble in the common organic solvents and in water. It had a drop number at 30° C. of 44.

Example 4

A thin body of a solution of 21.4 parts of 7-ethyl-2 methyl-undecanol-4 in 180 parts of bis-beta chloroethyl ether was flowed through a reactor formed of a forty-five foot length of .25 inch diameter glass tubing arranged in a spiral about three inches in diameter. During this flow, the solution was intimately contacted with an upwardly-flowing countercurrent stream of a gas mixture containing about 3% of sulphur trioxide in an inert gas largely nitrogen. During passage of the gas in contact with the said solution, the spiral was maintained at about −10° C. by suitable cooling. The rate of liquid flow was such that 201.4 grams of the solution passed through the reactor in 27 minutes.

The liquid mixture leaving the spiral was removed from contact with the sulphur trioxide and entered a receiver maintained at −10° C.

The liquid mixture from the receiver may be recycled through the reactor repeatedly to increase the amount of sulphur trioxide absorption. For example, by passing the solution through the reactor three times, 93% of the theoretical amount of sulphur trioxide was absorbed.

The resultant reaction mixture was neutralized and further treated in the manner described in Example 2. The neutral sulphate ester thus obtained was a white solid, soluble in water, methanol, acetone, and ether. It had a drop number of 80 at 30° C.

The high-boiling solvent employed in accordance with this invention also serves for separating from the neutral esters the major portion of any organic impurities, such as traces of olefines or unreacted alcohol. The impurities are isolated in the ether solution upon neutralization of the sulphation reaction mixture with aqueous alkali.

Although the relatively high-boiling bis-beta chloroethyl ether is a solvent for the chlorsulphonic acid as well as for the alcohols, such as butyloctanol and dibenzylbutanol, it does not react appreciably with the said acid at room temperature, and therefore may be employed even at these temperatures as an inert diluent for each of the reactants in the sulphation step. It serves for regulating the extent of the reaction and for preventing local overheating while insuring the presence of sufficient concentrations of each reactant to cause the reaction to proceed promptly to substantial completion.

While this invention is not to be limited by any theory advanced, it may be that dichlorethyl ether and chlorsulphonic acid form some kind of loosely-bound compound, such as is typical of ethers, and due to the presence of this compound the violence of the reaction between the alcohol and acid is greatly moderated. This is evidenced by the fact that a large amount of heat is given off on mixing the chlorsulphonic acid with the high-boiling ether, while the heat of reaction generated during the sulphation is comparatively low.

The high-boiling solvents of the invention are also solvents for the acid sulphates formed, which are heavy viscous liquids. Thus the reaction mixture at all times is maintained suitably fluid for facilitating a reaction which proceeds uniformly to completion.

The current of dry inert gas passed through the reaction mixture to remove hydrogen chloride and prevent side reactions does not remove substantial amounts of the solvent, due to the relatively high boiling point of the latter. Bis-beta chloroethyl ether boils at 178° C. at atmospheric pressure.

Other methods than that described for removing the hydrogen chloride generated in the sulphation may be employed. For instance, the sulphation may be conducted under vacuum, with the blow off gases being discharged at atmospheric pressure. The hydrogen chloride may also be recovered as dilute hydrochloric acid by scrubbing with water the offcoming gases containing it; or it may be used in well known syntheses, as in ethyl chloride production.

The purification steps by which inorganic salts are removed from the neutral sulphate esters by filtration of alcohol solutions thereof may be eliminated, since for many purposes the presence of these salts is not objectionable.

In drying the neutral esters, it is within the scope of the invention to use various other means for the purpose which will not decompose the esters, such as spray drying under vacuum.

The "drop number" measurements mentioned supra consist in counting the number of drops formed by a plane-ground capillary tip when a fixed volume (for convenience about 10 c. c.) of an aqueous solution containing 0.25% by weight of the sample is allowed to flow slowly into a body of kerosene at 30° C. The tip is of such size that,—when water is employed as the standard of comparison,—the said fixed volume of water will be divided into about 25 drops. The rate of flow is so regulated that the drops form distinctly and can be counted conveniently. The relative power of the samples for depressing the interfacial tension is measured directly by the number of drops formed.

The term "high-boiling solvent", and similar expressions appearing in the specification and claims, are intended to refer generally to those solvents having boiling points of around 170° C. or above, in accordance with the nomenclature which long has been employed in the lacquer industry to differentiate such solvents from low-boiling and medium-boiling solvents.

The invention is susceptible of modification within the scope of the appended claims.

We claim:

1. The process which comprises reacting a dilute solution of a sulfating agent in a high-boiling halogenated lower dialkyl ether and a solution of an alcohol having at least eight carbon atoms in its molecular structure in a high-boiling halogenated lower dialkyl ether, one of the said solutions being gradually introduced into the other of said solutions.

2. The process which comprises reacting with a sulphating agent upon an alcohol having at least eight carbon atoms in its molecular structure, in the presence of a high-boiling halogenated lower dialkyl ether.

3. The process which comprises reacting with a sulphating agent upon an alcohol having at least eight carbon atoms in its molecular structure, in the presence of a high-boiling chlorine-substituted lower dialkyl ether.

4. The process which comprises reacting with a sulphating agent upon an alcohol having at least eight carbon atoms in its molecular structure, in the presence of bis-beta chlorethyl ether.

5. The process which comprises gradually introducing a solution of a sulphating agent in a high-boiling chlorinated lower dialkyl ether into a solution of an alcohol having at least eight carbon atoms in its molecular structure in a chlorinated lower dialkyl ether which is a high-boiling common solvent for the alcohol and the sulphating agent, and which is also a solvent for the acid sulphate thus produced.

6. The process which comprises reacting a solution of chlorosulphonic acid in a high-boiling dihalogenated lower dialkyl ether with a solution of an alcohol having at least eight carbon atoms in its molecular structure in a high-boiling dihalogenated lower dialkyl ether which is a common solvent for the alcohol and the sulphating agent, and which is also a solvent for the acid sulphate thus produced.

7. The process which comprises reacting with a non-aqueous solution of a sulphating agent upon a solution of a branched-chain alcohol having at least eight carbon atoms in its molecular structure, in a high-boiling chlorinated lower dialkyl ether which is a solvent for the latter.

8. The process which comprises reacting with a non-aqueous solution of a sulphating agent upon a solution of a branched-chain alcohol having at least eight carbon atoms in its molecular structure in a high-boiling chlorinated lower dialkyl ether which is a solvent for the latter, at temperatures within the range from about $-20°$ C. to about $+60°$ C.

9. The process which comprises reacting with a dry sulphating agents in an inert diluting medium upon a solution of a branched-chain alcohol in a $\beta\beta'$ dihalogenated lower dialkyl ether which is a high-boiling solvent for both the alcohol and the sulphating agent.

10. The process which comprises reacting with a dry sulphating agent in an inert diluting medium upon a solution of a branched-chain primary or secondary alcohol in a high-boiling chlorinated lower dialkyl ether which is a solvent for both the alcohol and the sulphating agent.

11. The process which comprises reacting with a dry sulphating agent upon a solution of a branched-chain alcohol having at least eight carbon atoms in its molecular structure in bis-beta chloroethyl ether at a temperature within the range from about 0° C. to about 60° C.

12. The process which comprises intimately mixing together successive portions of a solution of a dry sulphating agent in a high-boiling halogenated lower dialkyl ether, and a solution of an alcohol having at least eight carbon atoms in its molecular structure in a high-boiling halogenated lower dialkyl ether, and reacting the said alcohol and sulphating agent at temperatures maintained within the range from about 0° C. to about 60° C.

13. The process which comprises intimately mixing together successive portions of a solution of a dry sulphating agent in a high-boiling chlorinated lower dialkyl ether, and a solution of an alcohol having at least eight carbon atoms in its molecular structure in a high-boiling chlorinated lower dialkyl ether, and reacting the said alcohol and sulphating agent at temperatures maintained within the range from about 0° C. to about 60° C.

14. The process which comprises intimately mixing together a solution of a dry sulphating agent in bis-beta chlorethyl ether, and a solution of an alcohol having at least eight carbon atoms in its molecular structure in bis-beta chlorethyl ether, and reacting the said alcohol and sulphating agent at temperatures maintained within the range from about 0° C. to about 60° C.

15. The process which comprises reacting an alcohol having at least eight carbon atoms in its molecular structure with gaseous sulphur trioxide in an inert diluting medium, in the presence of a high-boiling halogenated dialkyl ether which is a solvent for the alcohol, the sulphur trioxide, and the resultant sulphate ester of the alcohol.

16. The process which comprises reacting an alcohol having at least eight carbon atoms in its molecular structure in solution in a high-boiling chlorinated lower dialkyl ether, and a dilute solution of gaseous sulphur trioxide in an inert gaseous medium.

17. The process which comprises passing a stream of a dilute mixture of gaseous sulphur trioxide in an inert gas into intimate contact with a thin body of a solution of an alcohol having at least eight carbon atoms in its molecular structure, dissolved in a high-boiling dihalogenated lower dialkyl ether, while the said thin body is flowing countercurrent to the said stream, and maintaining the body of solution at a low temperature within the range from about $-20°$ C. to about 0° C.

18. The process which comprises passing a stream of a dilute mixture of gaseous sulphur trioxide in an inert gas into intimate contact with a thin body of a solution of an alcohol having at least eight carbon atoms in its molecular structure dissolved in a high-boiling chlorinated lower dialkyl ether while the said thin body is flowing countercurrent to the said stream, and maintaining the body of solution at a low temperature not substantially higher than 0° C.

19. The process which comprises passing a stream of a dilute mixture of gaseous sulfur trioxide in an inert gas into intimate contact with a thin body of a solution of an alcohol having at least eight carbon atoms in its molecular structure dissolved in a high-boiling dihalogenated lower dialkyl ether while the said thin body is flowing countercurrent to the said stream, maintaining the body of solution at a low temperature within the range from about $-20°$ C. to about 0° C., and recycling the said solution together with a fresh stream of the said gaseous mixture.

20. The process which comprises flowing a stream of a gas mixture containing a few percent of gaseous sulphur trioxide into intimate contact with a thin flowing body of a solution of an alcohol having at least eight carbon atoms in its molecular structure dissolved in a high-boiling chlorinated lower dialkyl ether moving countercurrent thereto, while maintaining the said body of solution at a temperature not substantially higher than about 0° C.

21. The process which comprises flowing a stream of a gas mixture containing a few percent of gaseous sulphur trioxide into intimate contact with a thin flowing body of a solution of an alcohol having at least eight carbon atoms in its molecular structure dissolved in a high-boiling chlorinated lower dialkyl ether moving countercurrent thereto and containing from about 5% to about 20% of the said alcohol, while maintaining the said body of solution at a temperature not substantially higher than about 0° C., and withdrawing the resultant sulphated products.

22. The process which comprises conducting a stream of gaseous sulphur trioxide diluted with an inert carrier gas into contact with a thin film of a solution of an alcohol having at least eight carbon atoms in its molecular structure in a high-boiling dihalogenated lower dialkyl ether, the said film flowing countercurrent to the sulphur trioxide upon a surface cooled to a temperature within the range from about 0° C. to about −20° C., neutralizing the resultant reaction product with an aqueous solution, thereby forming an aqueous layer and a solvent layer, separating the two layers, evaporating the aqueous layer, and recovering therefrom the residual neutral sulphate ester.

23. The process which comprises conducting a stream of gaseous sulphur trioxide diluted with an inert carrier gas into contact with a thin moving film of a solution in dichlorethyl ether of an alcohol having at least eight carbon atoms in its molecular structure, flowing countercurrent to the sulphur trioxide upon a surface cooled to a temperature within the range from about 0° C. to about −20° C., neutralizing the resultant reaction product with an aqueous alkaline solution, thereby forming an aqueous layer and a solvent layer, separating the two layers, evaporating the aqueous layer, and recovering the residual neutral sulphate ester.

24. The process which comprises reacting with chlorosulphonic acid upon an alcohol having at least eight carbon atoms in its molecular structure, in the presence of a high-boiling halogenated lower dialkyl ether.

25. The process as defined in claim 24, wherein the high-boiling ether employed is bis-β-chlorethyl ether.

26. The process which comprises reacting with a sulfating agent upon a secondary aliphatic alcohol having at least eight carbon atoms in its molecular structure, in the presence of a high-boiling halogenated lower dialkyl ether.

27. Process as defined in claim 26, wherein the said ether is bis-β-chlorethyl ether.

GEORGE H. LAW.
RAYMOND W. McNAMEE.